United States Patent [19]
Stevens et al.

[11] Patent Number: 5,295,308
[45] Date of Patent: Mar. 22, 1994

[54] MEASURING, MARKING AND CUTTING TOOL

[76] Inventors: Mark D. Stevens, Main St., East Brookfield, Mass. 01515; Frank N. Mosher, 70 Quaboag St., Brookfield, Mass. 01506

[21] Appl. No.: 707,858

[22] Filed: May 30, 1991

[51] Int. Cl.$^5$ .................................. G01B 3/10
[52] U.S. Cl. ........................... 33/770; 33/668; 33/768; 33/769; 33/42
[58] Field of Search ............... 33/668, 768, 769, 770, 33/761, 42, 43, 44, 759

[56] References Cited

U.S. PATENT DOCUMENTS

| | | | |
|---|---|---|---|
| 720,507 | 2/1903 | Van Horn | 33/761 X |
| 2,305,065 | 12/1942 | Corkish | 33/42 |
| 2,651,843 | 9/1953 | Goodford | 33/27.03 |
| 2,942,348 | 6/1960 | Caruso | 33/761 X |
| 3,148,455 | 9/1964 | Aciego . | |
| 3,744,134 | 7/1973 | Zima | 33/768 |
| 4,015,337 | 4/1977 | Taylor . | |
| 4,296,554 | 10/1981 | Hammerstrom . | |
| 4,630,376 | 12/1986 | Pentecost . | |
| 4,744,150 | 5/1988 | Horvath | 33/760 |
| 4,760,648 | 8/1988 | Doak et al. . | |
| 4,890,393 | 1/1990 | St. Jean | 33/668 X |
| 4,914,830 | 4/1990 | Legare . | |
| 4,964,225 | 10/1990 | Waldherr . | |

OTHER PUBLICATIONS

K & E, Popular Mechanics, Aug. 1956, p. 230.

*Primary Examiner*—William A. Cuchlinski, Jr.
*Assistant Examiner*—Alvin Wirthlin
*Attorney, Agent, or Firm*—James F. Baird

[57] ABSTRACT

In measuring, cutting, and marking tool incorporating a tape measure having a case with a holder for a marking or cutting device integrally formed thereon. The tool provides reduced friction for marking and cutting tasks involving sliding of the tool. Friction reducing elements are provided on the case, e.g. slide pads or rollers. An end clip on the tape has friction reducing means involving beveled edges, angled wings, or rollers for reduced friction. An intermediary sliding handle between the end of the tape and the case and having reduced friction means and a gripping element is provided. A sharpening device for the marking or cutting tool is integrated in the case.

3 Claims, 5 Drawing Sheets

MEASURING, MARKING AND CUTTING TOOL

FIELD OF THE INVENTION

This invention is related to the fields of trades and crafts, especially those involved in marking, cutting, and measuring of workpieces. It is particularly concerned with the building trades, especially carpentry, dry wall work, and other construction fields, such as display building.

BACKGROUND OF THE INVENTION

Many measuring, marking, and cutting tasks in the building trades and related fields are characterized by somewhat incompatible goals. The tradesman would like to do his measuring and cutting accurately but he is also concerned with the efficiency of his work including speed, simplicity, and comfort. This is especially true when the tradesman needs to carry out a series of repetitive tasks involving measuring, such as: preparing pickets for a fence, setting up slots for a porch rail, installing studs, and marking and cutting floor and sealing joists and rafters. Such tasks also include marking off sections of plaster board, panel, other wall board, and cardboard, and cutting these materials. Such tasks might also involve marking off metal sections for cutting.

Various complex jigs have been created to mark and cut under such circumstances. Furthermore a number of built-in or retro-fit constructions have been developed for association with tape measuring devices to carry out the simultaneous measuring and marking of a workpiece. These devices are used to make a mark on a workpiece at a given length by attaching the marking device to the case of the tape measure and creating the mark by moving the case back and forth.

There are a number of disadvantages to this later approach. Under some circumstances the friction of the tape measure body or the tape itself on the workpiece causes a jerky movement during the marking which can result in inaccuracies. If the device is being used for cutting soft materials such as plaster board or cardboard, one or more measured marks must be made and then the mark must be extended by the use of a square or the like. Only then can the cut be made. Similarly, if a long mark or cut must be made, then numerous marks must first be made and then joined by the edge of a long straightedge. If a cut must be made, this involves a separate step. In all of the above cases, several tools must be used, or several steps carried out, or both.

These and other difficulties experienced with the prior art have been obviated in a novel and unobvious manner by the present invention. It is therefore a primary object of the present invention to provide for accurate measuring, marking, and cutting of workpieces using a single assembly.

It is another object of the invention to provide a measuring tool adapted to make long marks or cuts parallel to an edge.

A further object of the invention is to provide a measuring tool adapted to mark or cut circles.

It is another object of the invention to provide a measuring tool with which accurate marks and accurate cuts may be made using the same device.

It is a further object of the invention to provide a measuring, marking, and cutting tool which has an aesthetically pleasing visual effect, both as a whole and in each of its main component parts.

It is also an object of this invention to provide a tool as described above which is inexpensive to make and simple to use and which will provide a long useful life with minimum maintenance.

With these and other objects in view, as will be apparent to those skilled in the art, the invention resides in the combination of parts set forth in the specification, illustrated in the drawings, and covered by the claims appended to this specification.

SUMMARY OF THE INVENTION

A measuring tool having a coiled measuring tape is provided, in combination with accurate marking or cutting device in a holder integrally formed on the casing of the measuring tool, the tool further provided with friction reducing means at locations where the tool slides against a workpiece during use. More specifically, friction reducing means are provided on the bottom of the main case of the measuring tool, preferably at both ends. The tape itself has an end clip which is also provided with friction reducing means, preferably in the form of bevels directed away from the tape on the vertical portion of the end clip. In the preferred embodiment, a tape grasping slide handle is provided which is slidable on the tape between the end clip and the main case which is also provided with friction reducing means on the portion normally in contact with the workpiece.

The friction reducing means may also comprise small rollers on the bottom of the case or of the grasping handle, or on the portion of the end clip in contact with the workpiece.

Another aspect of the invention involves the provision of a sharpener attached to the casing of the tool for sharpening the marking or cutting device.

A further aspect of the invention is a novel and unobvious ornamental design for the overall tool, as well as for the main case, for the end clip, and for the grasping handle element.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
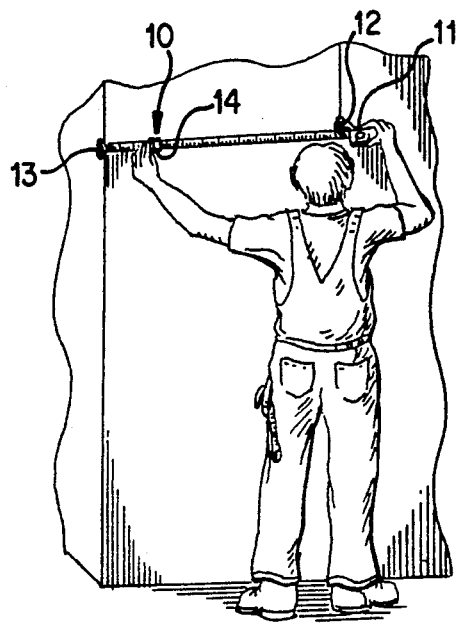
FIG. 1 illustrates the use of the invention to make a long mark or cut parallel to the edge of an elongated and extended workpiece.

Referring first to FIG. 1, a tradesman as shown using the device of the present invention to mark or cut a long line, parallel to the edge of the workpiece. The tool of the present invention is referred to generally by reference numeral 10. The tradesman is holding, with one hand, the main case 11 on which is integrally formed a cutting or marking device holder 12. With the other hand the tradesman is holding the tape grasping slide holder 14 of the present invention. Although free to move, the slide holder, under normal use, would be located at the extreme left next to the end clip 13.

The friction reducing end clip 13 of the present invention rests along the edge of the workpiece. The tradesman is using the device to make a long mark or cut parallel to this edge.

Figure 2:
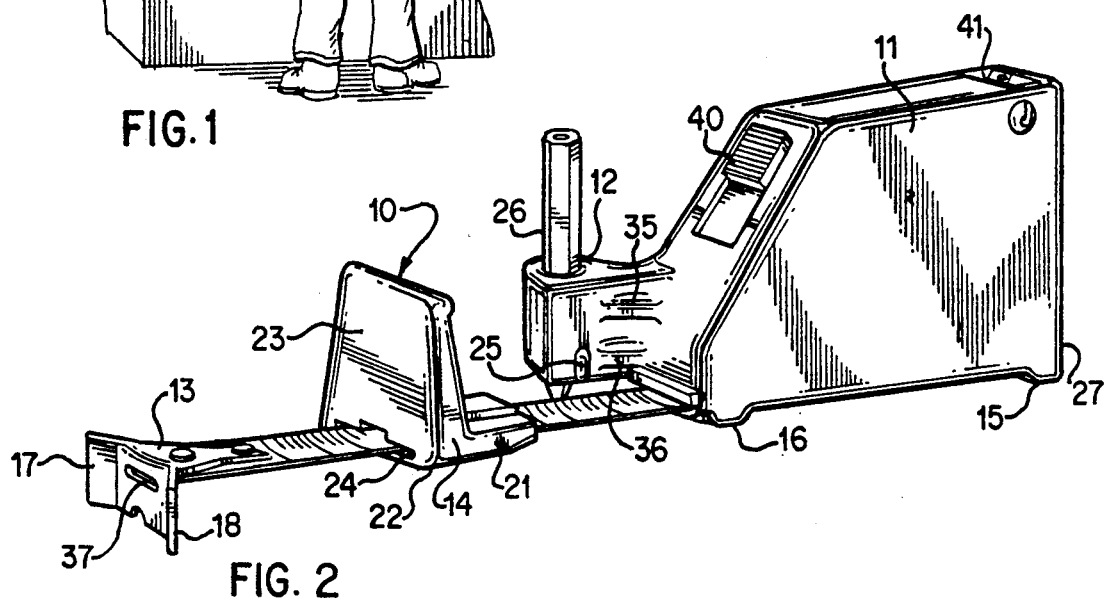
FIG. 2 is a perspective view of a measuring, marking, and cutting tool according to the present invention.

The details of the present invention are shown more closely in perspective view, FIG. 2. The main case 11 has attached to it a marking and cutting device holder 12. The main case contains and dispenses a conventional measuring tape with a coiled end and a free end and having measuring indicia. The end clip 13 of the present invention is shown with a horizontal attaching portion attached to the tape and a vertical portion extending at right angles to the attaching portion. In this embodiment of the present invention, end clip wings 17 and 18 are provided extending outward from the vertical portion and angled slightly away from the tape. These wings provide for a reduction of the friction along the edge of the workpiece and prevents snagging and facilitates smooth movement of the end of the tape along the edge.

Likewise the main case 11 is provided in this embodiment with friction reducing slide pads 15 and 16. These are preferably provided at each end of the main case, crossing it transversely and having rounded or beveled edges. These slide pads also help to smooth the movement of the device as the marking or cutting is performed. The tape grasping slide handle 14 has a main body 21 which wraps around the tape to form slots such as 24 on each side and to create a friction reducing element such as 22 having rounded edges. Extending upward from the main body 21 of the slide handle is a grip 23 shaped to be held firmly and comfortably by the fingers.

In the preferred embodiment, the marking or cutting device holder 12 is provided with a position indicator 25 integrally formed thereon and adapted to show the exact position of the marking or cutting tool in terms of the measurement on the tape. This indicator is designed to be located an accurately predetermined distance from the far end 27 of the main case of the measuring device. Indicia may be provided to record, on the case, this distance. In this manner, a measurement can be made right up to a wall or other obstruction by adding this predetermined distance to the measurement indicated by the indicator. For example, if the indicator were located exactly 2 inches from the end of the main case, and pointed to 8'3", the distance from end clip to the obstruction would be 8'5". This adds versatility to the tool and is important and valuable for almost all its functions.

Figure 3:
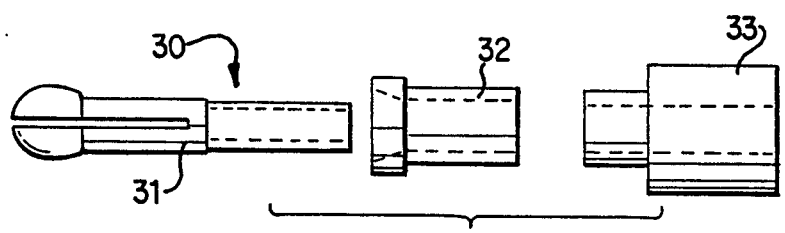
FIG. 3 is an exploded view of the components of a blade holding assembly to be inserted in place of the marking means.
Figure 4:
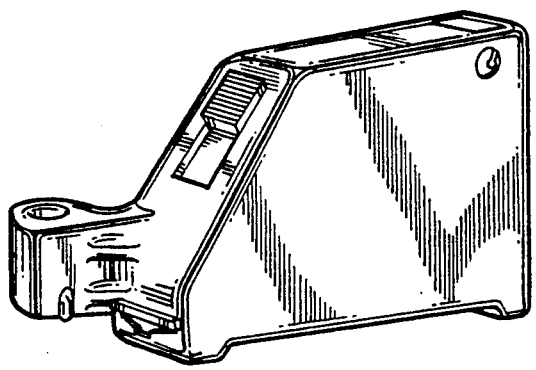
FIGS. 4 through 10 show the construction and ornamental design of a main case for a measuring device according to the present invention, the views being perspective, front elevation, rear elevation, right side elevation, left side elevation, top plan, and bottom plan, respectively.
Figure 5:
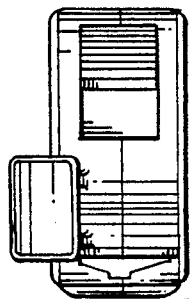
Figure 6:
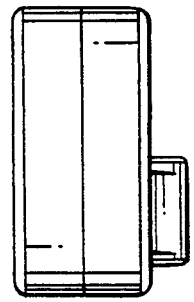
Figure 7:
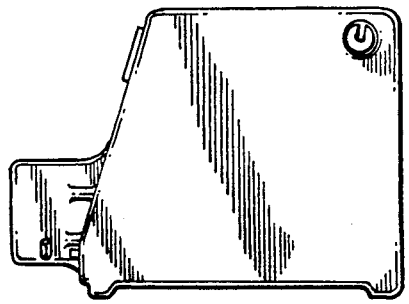
Figure 8:
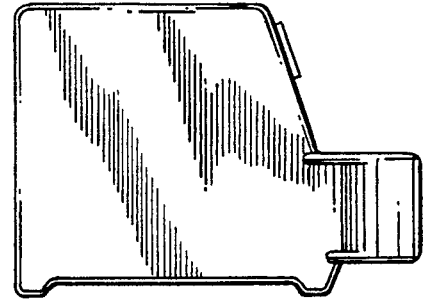
Figure 9:
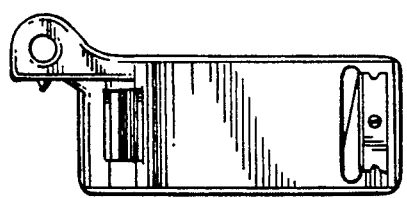
Figure 10:
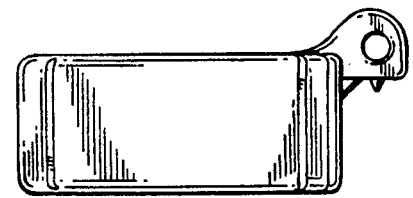
Figure 11:
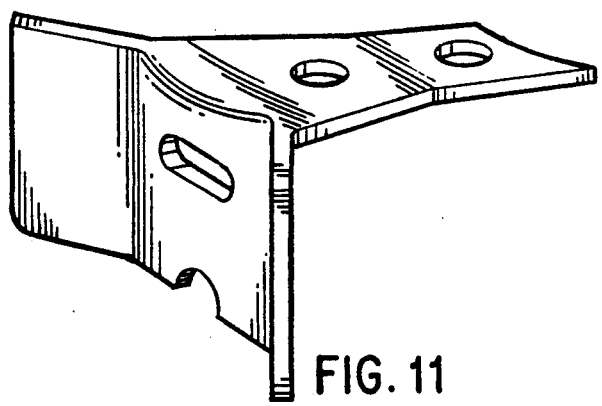
FIGS. 11 through 16 show both the structure and ornamental design of the end clip for the tape according to the present invention, the view being perspective, front elevation, rear elevation, top plan, bottom plan, and left and right side elevation views, respectively.
Figure 12:
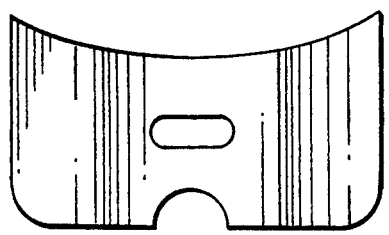
Figure 13:
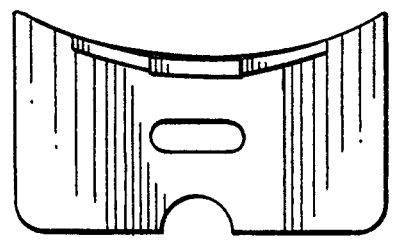
Figure 14:
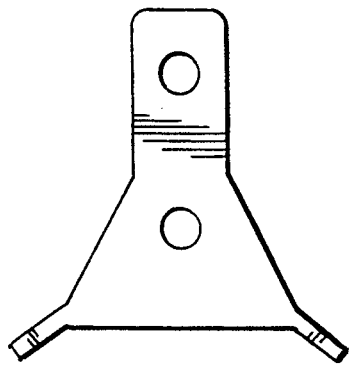
Figure 15:
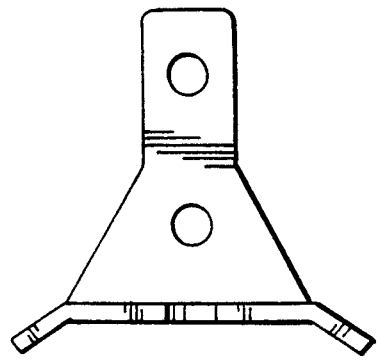
Figure 16:
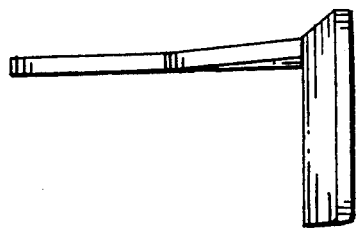
Figure 17:
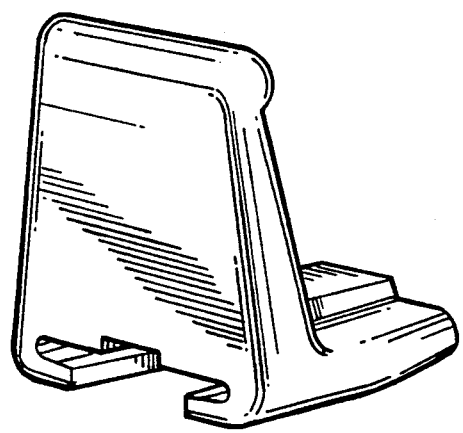
FIGS. 17 through 22 show the construction and ornamental design of a grasp handle slidable on the tape of the present invention, the views being perspective, front elevation, rear elevation, top plan, bottom plan, and left or right side elevation.
Figure 18:
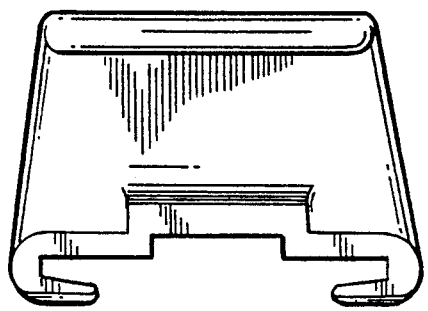
Figure 19:
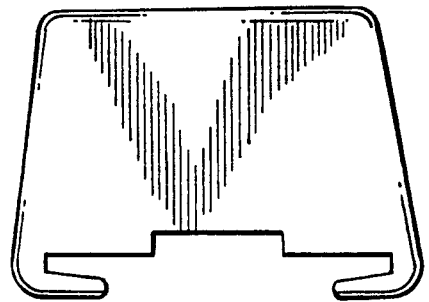
Figure 20:
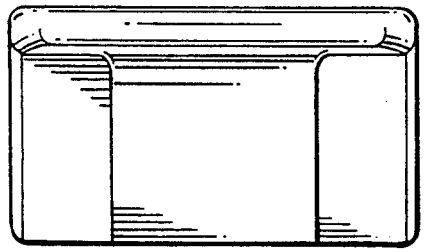
Figure 21:
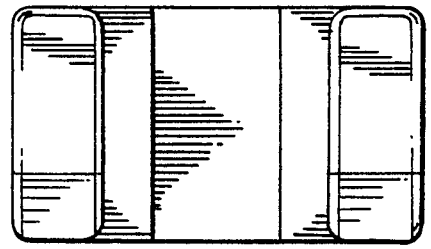
Figure 22:
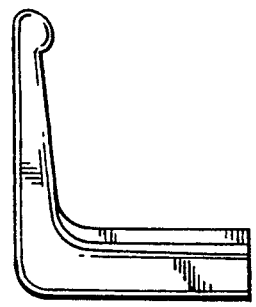

The marking device 26, shown in the device holder 12 of FIG. 2, can be replaced by other devices under appropriate circumstances. FIG. 3 shows an assembly for insertion in the device holder for replacing the marking device with a cutting device referred to generally by 30. The assembly includes a blade or scribe holder 31 made of resilient material and having a slot. A collet 32 is provided to press the blade or scribe holder and hold the scribe or blade. A locking nut is provided to assist in holding the assembly tightly in the marking or cutting device holder.

The use and operation of this invention will now be apparent from the above description. To make an ordinary mark for measurement of a distance, the tape end clip is rested against an edge, the tape is extended until the indicator 25 shows the desired distance, and the mark or scribe is made using the marking device 26 by moving the main case 11 on its friction reducing slide pads 15 and 16. The marking tool is of course adjusted in its holders so that its sharpened end rests lightly on the workpiece. If a long cut parallel to an edge is desired, the device is positioned in a similar manner but the tape is grasped at an intermediate point convenient to the user (normally, close to the end clip) by the tape grasping slide handle 14 by pinching it on the grip 23. The tape and the marking or scribing instrument are then moved with a light downward pressure towards the workpiece on both the main case and the tape slide handle and also with a slight bias of the end clip 13 toward the end of the workpiece, taking advantage of the low friction on this specially shaped end clip.

If it is desired to make a cut rather than a mark on the workpiece, the marking device 26 may be removed and the cutting device assembly 30 substituted for it. If a cut is to be made, of course, the blade should be so inserted so that it reaches to the depth of cut desired.

The main case is preferably manufactured in two halves, each half being preferably injection molded, with the marking and cutting device holder integrally molded on one of these halves. It may be preferable to reinforce the connection by means of webs 35 and 36. A tape locking system may also be provided operated by a lock button 40.

By fixing the end clip 13 rotatably about some fixed point, the device may also be used for drawing large circles or cutting such circles and curves. For this purpose a long slot 37 is provided through the end clip for use on a nail head.

Naturally the device holder on the present invention may be fitted with a regular pencil or a mechanical drafting pencil or pen, a felt-tip pen, a scribe or razor-type cutting means, etc., all of which may be either fixed, or retractable and extendable. A sharpening fixture 41 for any of these devices may be attached or integrally formed on the device. Such a fixture for the pencil should preferably produce a short, sharp point for accuracy.

In the preferred embodiment the sharpening fixture is built into the top rear part of the main case 11. The top surface of the top of the sharpening fixture is preferably flush to the top surface of the main case 11.

The device of the present invention should be aesthetically appealing as a whole and in its parts. For this reason the preferred aesthetic and ornamental design of the main case of the present invention, of the end clip of the present invention, and of the tape grasping slide handle of the present invention are fully disclosed in FIGS. 4 through 10, 11 through 16, and 17 through 22, respectively.

Figure 23:
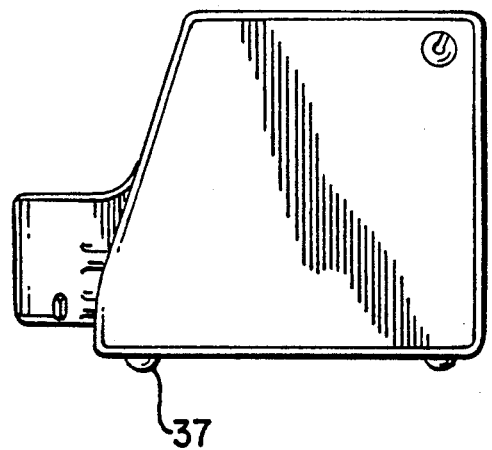
FIGS. 23, 24, and 25 illustrate an alternative friction reducing means on the main case, end clip, and tape grasping slide holder respectively.
Figure 24:
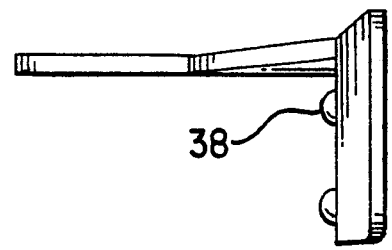
Figure 25:
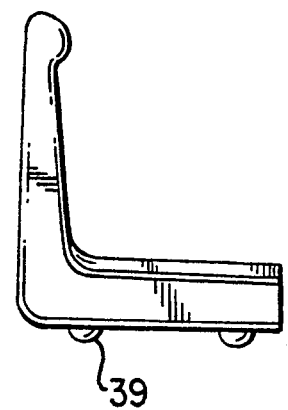

If especially smooth and friction-free operation is desired any one of: the main case, the end clip, and the tape grasping slide handle may be provided with small rollers. These can be, for example, ball rollers 37, 38, and 39 as shown in FIGS. 23, 24, and 25, where each element interacts with the workpiece.

Clearly minor changes could be made in the form and construction of this invention without departing from its material spirit. Therefore, it is not desired to confine the invention to the exact form shown herein and described, but it is desired to include all subject matter that properly comes within the scope claimed.

The invention having been thus described, what is claimed as new and desired to secure by Letters Patent is:

1. A measuring, marking, and cutting tool incorporating a measuring tape having a bound and coiled end, a free end, and measurement indicia comprising:
    (a) a main case adapted to store and dispense said tape, the case having a bottom and provided with means to lock said tape in a chosen extended position,
    (b) a device holder for holding a device, said holder integral with the case and associated with the measurement indicia on the tape via an accurate integral indicator means,
    (c) friction reducing means on the bottom of the main case configured to provide stable support for the main case to stand vertically,
    (d) an end clip attached to the free end of the tape and having a horizontal portion attached to the tape and a vertical portion adapted to extend over an edge of a workpiece, and
    (e) friction reducing rollers on the vertical portion of the end clip for engaging the workpiece.

2. A measuring, marking, and cutting tool incorporating a measuring tape having a bound and coiled end, a free end, and measurement indicia comprising:
    (a) a main case adapted to store and dispense said tape, the case having a bottom adapted for being positioned on a workpiece and provided with means to lock said tape in a chosen extended position,
    (b) a device holder for holding a device, said holder integral with the case and associated with the measurement indicia on the tape via an accurate integral indicator means,
    (c) friction reducing means on the bottom of the main case configured to provide stable support for the main case to stand vertically, and
    (d) a tape-grasping slide handle attached to the tape and freely, longitudinally slidable along the tape, the handle provided with a grip element away from the workpiece and friction reducing means toward the workpiece.

3. A tool according to claim 2, wherein said friction reducing means on the handle comprise rollers.

* * * * *